Patented Sept. 5, 1950

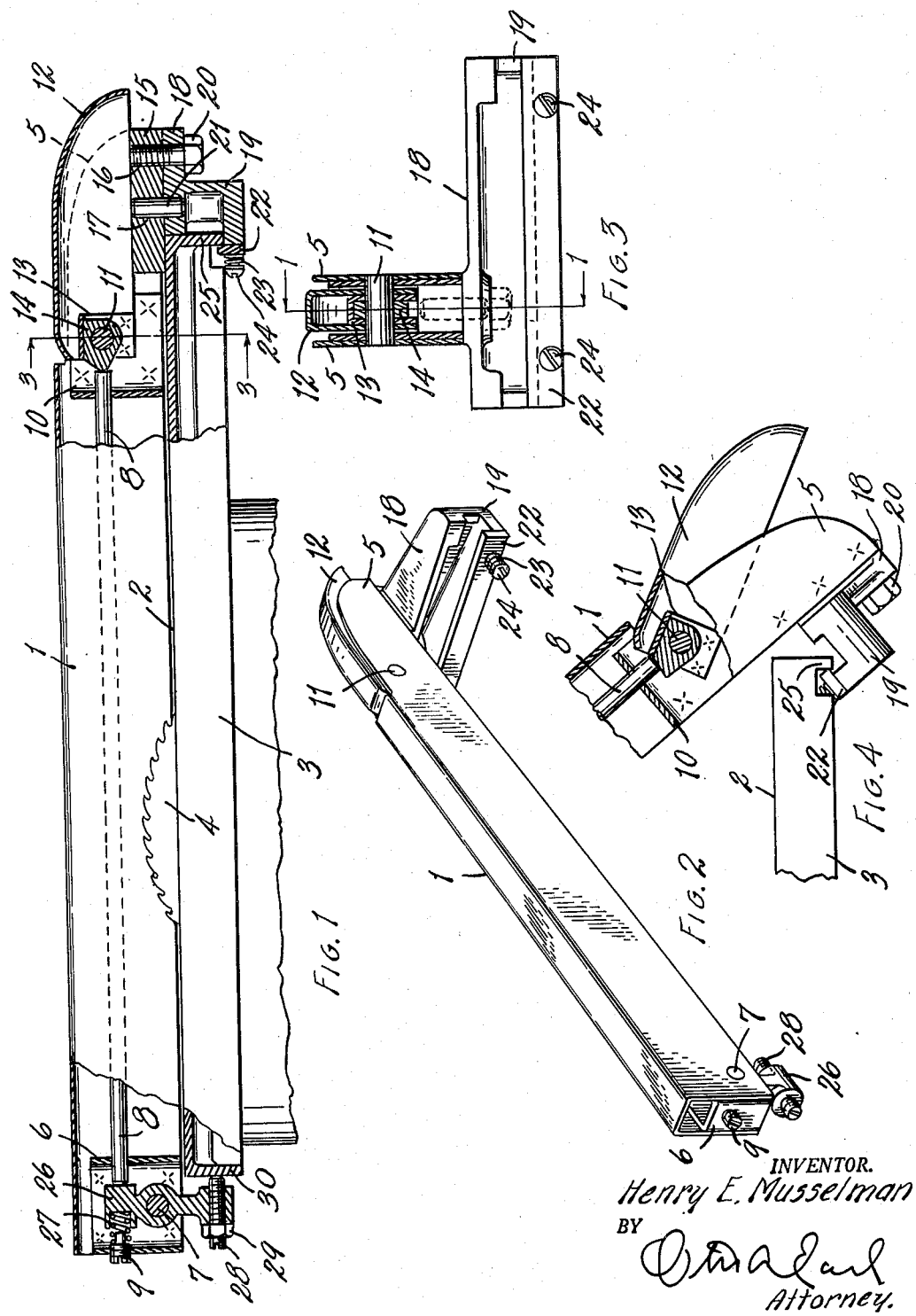

2,521,302

UNITED STATES PATENT OFFICE 2,521,302

SAW TABLE WORK GUIDE

Henry E. Musselman, Kalamazoo, Mich., assignor to Atlas Press Company, Kalamazoo, Mich.

Application May 4, 1946, Serial No. 667,369

9 Claims. (Cl. 143—174)

This invention relates to improvements in saw table work guide.

The main objects of this invention are:

First, to provide a work guide for a saw blade which is light and of inexpensive construction.

Second, to provide a light work guide which may be accurately and securely clamped in place on a saw table.

Third, to provide a work guide which may easily be adjusted to various positions and accurately and securely clamped at both ends of a saw table by means of one locking lever.

Fourth, to provide a work guide which may be quickly removed from the table by merely releasing the lever and picking up the guide.

The preferred form of the invention is illustrated in the drawings, in which:

Fig. 1 shows a side elevational view partially broken away and partially in longitudinal section on line 1—1 of Fig. 3 of a work guide embodying my invention as installed on a saw table.

Fig. 2 is a perspective view of the work guide.

Fig. 3 is a cross-sectional view of the work guide on a line corresponding to line 3—3 in Fig. 1.

Fig. 4 is a fragmentary view partially in section of the work guide in partially adjusted position.

The work guide consists of a guide member 1 which is arranged to be clamped to the top 2 of a circular saw table 3. The guide is easily adjustable along the table for guiding work with respect to the circular saw 4.

More particularly the guide 1 consists of a downwardly facing channel-shaped member formed as a light metal stamping and provided with the forwardly extending ears 5 on the flanges of the channel section.

Positioned between the flanges and at the rear end of the guide member and secured thereto as by welding is a bearing member 6 of rectangular cross-section which is also formed by bending light sheet-metal material. The bearing member 6 defines transverse apertures for supporting a pin 7 and longitudinally extending apertures for supporting a control rod 8 and the spring retaining screw 9.

At the forward end of the guide member and overlapping part of the ears 5 is a second bearing member 10 which is of forwardly opening channel shaped cross-section and is also formed from light sheet metal stock. The flanges of the bearing member 10 define apertures for supporting the shaft 11 while the web of the bearing member defines an opening for supporting the forward end of the control rod 8. Pivotally supported on the shaft 11 is the locking handle 12 which is formed as a stamping with downwardly opening channel-shaped cross-section. Secured as by welding within the rear end of the handle 12 is a U-shaped clip 13 to the upper side of which is secured a cam member 14 arranged to engage the end of the control rod 8.

The outer ends of the ears 5 have secured between their lower edges a block 15 of rigid metal defining a tapped aperture 16 and a smooth bore 17 which are positioned along the major axis of the guide member. The apertures 16 and 17 are arranged to accurately locate a T member 18 on the under side of the guide member.

The T member 18 is formed of rigid material such as a metal casting, and is provided with a depending flange 19 of rearwardly opening angular cross-section. The upper plate of the T member defines apertures registering with the apertures 16 and 17, through which the cap-screw 20 and pin 21 are passed to secure the T member to the guide member. The rear edge of the T member is machined to be perpendicular to a line through the centers of the apertures therein. Secured to the rear edge of the flange 19 is a plate 22 which projects upwardly above the flange and is yieldingly held in place by the springs 23 and screws 24. The plate 22 is arranged to engage behind the flange 25 on the saw table.

Mounted on the pin 7 at the rear end of the guide 1 is an arm 26, the upper end of which is arranged to be engaged by the control rod 8. The upper end of the arm is also recessed to receive the end of a spring 27, the tension of which may be varied by adjusting the screw 9. The lower end of the arm 26 defines an aperture through which the threaded screw 28 extends. The screw 28 may be locked in adjusted position by the lock-nut 29 and is arranged to engage the rear flange 30 of the saw table.

The rear edge of the T member 18 is accurately formed at right angles with a line passed through the centers of the screw 20 and pin 21, so that when the edge of the T member is drawn against the forward flange of the saw table, the guide 1 will of necessity be at right angles to the forward edge of the saw table and parallel to the saw 4.

By lifting up on the handle 12 the cam 14 will move away from the forward end of the control rod 8, permitting the spring 27 to rotate the arm 26 in a clockwise direction as viewed in the drawings and moving the screw 28 away from the rear flange of the saw table. The rear end of the guide may then be lifted up, tilting the T member as shown in Fig. 4 and the plate 22 may be disengaged from the forward flange of the saw table. The guide may be installed on the saw table by reverse procedure. If it is desired to merely adjust the guide relative to the saw, the clamping action of the rear arm 26 may be released by lifting the handle 12 and the guide then slid along the table without lifting it therefrom.

I have described a highly practical embodiment of my invention. No attempt has been made to show other adaptations, as it is believed that this disclosure will enable those skilled in the art to embody the invention as may be desired.

Having thus described my invention, what I claim as new and desire to secure by Letters Patent is:

1. A guide bar for a saw table having a vertical rear edge and depending flange with a rearwardly facing surface along the front of said table comprising a guide member of downwardly opening channel shaped cross-section, bearing members positioned within said channel section at the rear and near the front of said guide member, a control rod extending between said bearing members, a locking arm pivotally supported by the rear bearing member and engageable at one end with said rod, the other end of said arm being engageable with said rear edge of said table, a handle pivotally supported on the forward bearing member, a cam member secured to said handle and engageable with said rod to press said rod rearwardly against said locking arm, a T-member secured to the under side of said guide member on the forward end thereof and engageable with the front edge of said table, and a rearwardly offset upwardly projecting flange yieldably secured on said T member engageable with said rearwardly facing surface on said depending flange.

2. A guide bar for a saw table having a vertical rear edge and depending flange with a rearwardly facing surface along the front of said table comprising a guide member of downwardly opening channel shaped cross-section, bearing members positioned within said channel section at the rear and near the front of said guide member, a control rod extending between said bearing members, a locking arm pivotally supported by the rear bearing member and engageable at one end with said rod, the other end of said arm being engageable with said rear edge of said table, a handle pivotally supported on the forward bearing member, a cam member secured to said handle and engageable with said rod, a T member secured to the under side of said guide member on the forward end thereof, spring means urging said locking arm to unlocked position, and a spring-pressed flange plate secured to the bottom of said T member on the rear edge thereof and engageable with said rearwardly facing surface on said depending flange.

3. A guide bar for a saw table having a vertical rear edge and depending flange with a rearwardly facing surface along the front of said table comprising a guide member of downwardly opening channel shaped cross-section, bearing members positioned within said channel section at the rear and near the front of said guide member, a control rod extending between said bearing members, a locking arm pivotally supported by the rear bearing member and engageable at one end with said rod, the other end of said arm being engageable with said rear edge of said table, spring means for urging said arm toward said rod, screw means mounted in rear bearing member for adjusting said spring, a handle pivotally supported on the forward bearing member, a cam member secured to said handle and engageable with said rod to press said rod rearwardly against said locking arm, a T member secured to the under side of said guide member on the forward end thereof and engageable with the front edge of said table, and a rearwardly offset upwardly projecting flange yieldably secured on said T member engageable with said rearwardly facing surface on said depending flange.

4. A work guide for a saw table comprising a guide member formed as a stamping of channel-shaped cross-section, forwardly extending ears formed as continuations of the flanges of said guide member, a forwardly opening channel shaped stamping forming a bearing member and secured between the flanges of said guide member and near the front thereof, a hollow folded rectangular bearing member positioned between the flanges of said guide member at the rear thereof, rear locking means pivotally supported in said rectangular bearing member and projecting therebelow for engagement with the rear edge of the table, forward locking means including a cam pivotally supported in said channel shaped bearing member, a handle on said cam swingable between said ears, a rod extending through said guide member between said cam and said rear locking means for actuating said locking means, and a T member secured to the under side of said ears at the forward end thereof.

5. A work guide for a saw table comprising a guide member formed as a stamping of channel-shaped cross section, forwardly extending ears formed as continuations of the flanges of said guide member, a forwardly opening channel shaped stamping forming a bearing member and secured between the flanges of said guide member and over-lapping the junction of said ears with the body of said guide member, a hollow folded rectangular bearing member positioned between the flanges of said guide member at the rear thereof, rear locking means pivotally supported in said rectangular bearing member and projecting therebelow for engagement with the rear edge of the table, forward locking means including a cam pivotally supported in said channel shaped member, a handle on said cam swingable between said ears, a rod extending through said guide member between said cam and said rear locking means for actuating said locking means, a solid block positioned between said ears, and a T member secured to said block.

6. In combination with a guide member of downwardly opening channel shaped cross section for a saw table, pivoted locking means at the rear of said guide member, a control rod operatively engageable with said lock means and extending forwardly from said locking means, a locking handle having a downwardly opening channel shaped cross-section pivotally supported near the forward end of said guide member and between the flanges thereof, the web of said guide member being cut away over said handle, a U-shaped bracket positioned within and reinforcing the channel section of said handle and around the pivot thereof, and a cam member positioned within said U-shaped bracket and around said pivot for engagement with said control rod, said cam member having a flat surface engaging the web of said bracket whereby movement of said handle and bracket will rotate said cam member.

7. A structure of the class described comprising a guide bar member of down facing channel section formed as a sheet metal stamping and having ears projecting forwardly as extensions of the side flanges of said channel section, front and rear bearing members also formed as sheet metal stampings disposed between the flanges of the bar member and welded thereto, a control rod extending through said bearing members and slidably supported thereby, a locking arm pivotally mounted intermediate of its ends within the rear bearing member and provided with an adjustable table engaging screw at its lower end, a spring acting to urge said locking arm to disengaged position, the inner end of said locking arm being disposed to be engaged by said rod in opposition to said spring, a handle pivotally mounted on the bearing member at the front of said bar and provided with a cam coacting with the front end of said control rod, said handle being disposed between said ears for at least three-fourths of the length of said handle, and a table engaging member mounted on the front end of said ears to engage a table in opposed relation to said locking arm.

8. A structure of the class described comprising a guide bar member of down facing channel section provided with front and rear bearing members, a control rod extending through said bearing members and slidably supported thereby, a locking arm pivotally mounted intermediate of its ends and within the rear bearing and provided with an adjustable table engaging jaw at its lower end, a spring acting to urge said locking arm to disengaged position, the inner end of said locking arm being disposed to be engaged by said rod in opposition to said spring, a cam pivotally mounted at the front of said bar to press against the front end of said control rod, and a table engaging member mounted on the front end of said bar to engage a table in opposed relation to said locking arm jaw.

9. A structure of the class described comprising a guide bar member of down facing channel section provided with front and rear bearing members, a control rod extending through said bearing members and slidably supported thereby, a locking arm pivotally mounted intermediate of its ends and within the rear bearing and provided with a table-engaging jaw at its lower end, a spring acting to urge said locking arm to disengaged position, the inner end of said locking arm being disposed to be engaged by said rod in opposition to said spring, a cam pivotally mounted at the front of said bar to press against the front end of said control rod, and a table engaging member mounted on the front end of said bar to engage a table in opposed relation to said locking arm jaw.

HENRY E. MUSSELMAN.

REFERENCES CITED

The following references are of record in the file of this patent:

UNITED STATES PATENTS

| Number | Name | Date |
| --- | --- | --- |
| 1,938,548 | Tautz | Dec. 5, 1933 |
| 2,075,282 | Hedgpeth | Mar. 30, 1937 |
| 2,101,709 | Hedgpeth | Dec. 7, 1937 |
| 2,140,323 | Lonskey | Dec. 13, 1938 |
| 2,166,703 | Boice | July 18, 1939 |
| 2,265,335 | Aumann | Dec. 9, 1941 |
| 2,325,082 | Tautz | July 27, 1943 |